US012705196B2

(12) United States Patent
Toinaga et al.

(10) Patent No.: US 12,705,196 B2
(45) Date of Patent: Aug. 11, 2026

(54) CONTROLLER, SETTING METHOD, COMPUTER-READABLE RECORDING MEDIUM, AND INFORMATION PROCESSING APPARATUS

(71) Applicant: Yokogawa Electric Corporation, Tokyo (JP)

(72) Inventors: Takeshi Toinaga, Tokyo (JP); Yoshitaka Yoshida, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 25 days.

(21) Appl. No.: 18/888,884

(22) Filed: Sep. 18, 2024

(65) Prior Publication Data

US 2025/0110904 A1 Apr. 3, 2025

(30) Foreign Application Priority Data

Sep. 29, 2023 (JP) ................................ 2023-170180

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 11,726,460 | B2 | 8/2023 | Nixon et al. | |
| 2016/0110304 | A1 | 4/2016 | Mori et al. | |
| 2018/0267711 | A1 | 9/2018 | Kitamura et al. | |
| 2020/0100304 | A1* | 3/2020 | Liu ....................... | H04W 92/04 |
| 2022/0075352 | A1 | 3/2022 | Nixon et al. | |
| 2022/0292043 | A1 | 9/2022 | Yoshino | |

FOREIGN PATENT DOCUMENTS

| | | | |
|---|---|---|---|
| JP | H03218550 | A | 9/1991 |
| JP | 2016081415 | A | 5/2016 |
| JP | 2022046438 | A | 3/2022 |

OTHER PUBLICATIONS

Extended European Search Report (EESR) dated Feb. 17, 2025 for European Patent Application No. 24202161.6.
Japanese Office Action (JPOA) dated Feb. 24, 2026 for Japanese Patent Application No. 2023-170180; English machine translation.

* cited by examiner

*Primary Examiner* — Scott C Sun
(74) *Attorney, Agent, or Firm* — RANKIN, HILL & CLARK LLP

(57) ABSTRACT

A controller transmits a request for input/output setting of data to a management server, receives input/output information that defines the input/output setting and that is associated with the controller that performs control of a system from the management server, and performs the input/output setting of the own instrument based on the received input/output information.

15 Claims, 6 Drawing Sheets

100
REGISTER INDIVIDUAL INFORMATION
S1
20
DB
INSTRUMENT DATABASE
ACQUIRE INPUT/OUTPUT INFORMATION
S2
10
MANAGEMENT SERVER
TRANSMIT INPUT/OUTPUT INFORMATION
S3
SET INPUT/OUTPUT
S4
CONTROL SYSTEM A
EA
ENGINEER
30A
CONTROLLER
PLANT A
40A-1
FIELD DEVICE
40A-2
FIELD DEVICE
40A-3
FIELD DEVICE
CONTROL SYSTEM B
EB
ENGINEER
30B
CONTROLLER
PLANT B
40B-1
FIELD DEVICE
40B-2
FIELD DEVICE
40B-3
FIELD DEVICE

FIG.2

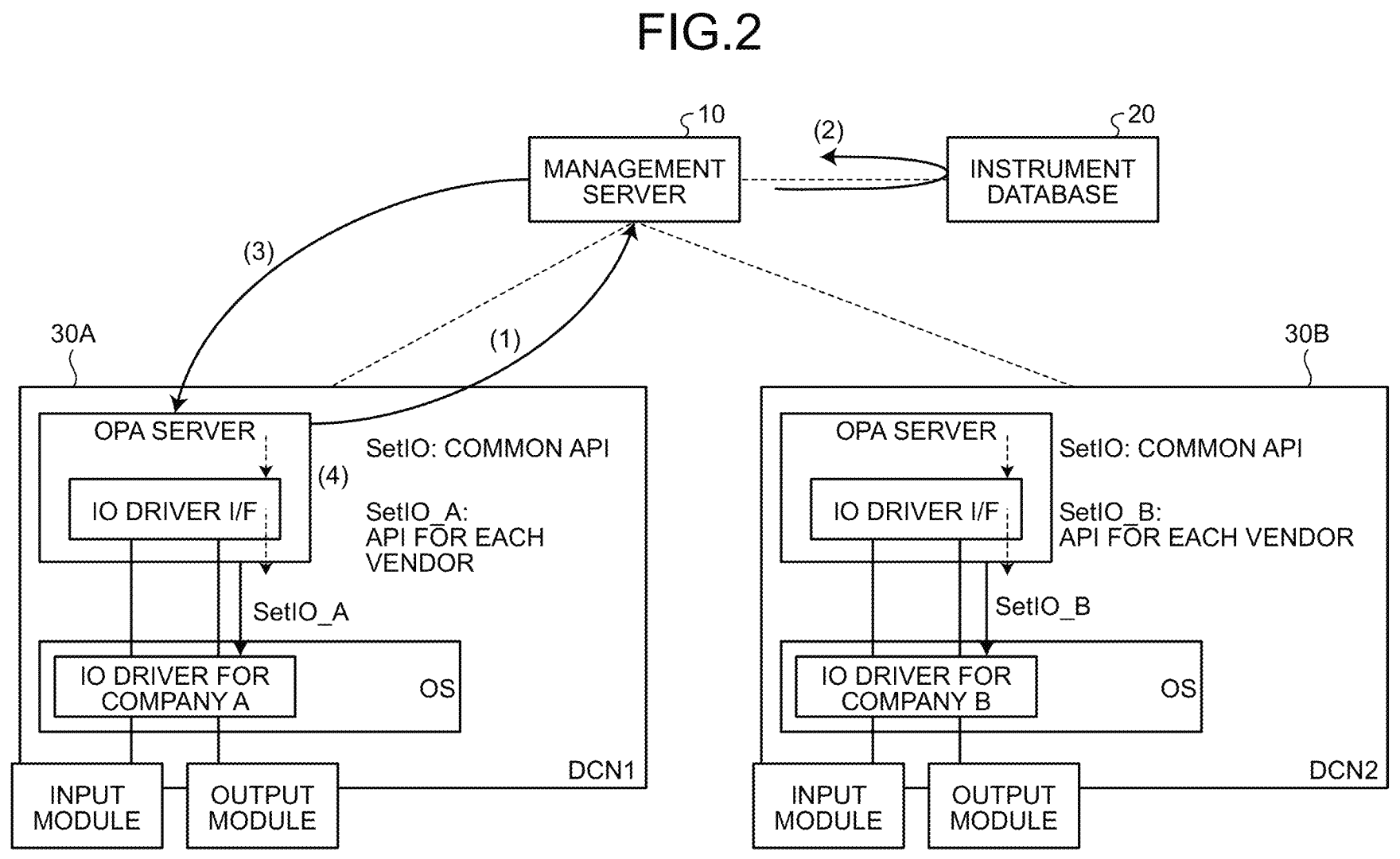

10 MANAGEMENT SERVER

20 INSTRUMENT DATABASE (1)

(2)

(3)

(4)

30A

OPA SERVER

IO DRIVER I/F

SetIO: COMMON API

SetIO_A: API FOR EACH VENDOR

SetIO_A

OS

IO DRIVER FOR COMPANY A

INPUT MODULE

OUTPUT MODULE

DCN1

30B

OPA SERVER

IO DRIVER I/F

SetIO: COMMON API

SetIO_B: API FOR EACH VENDOR

SetIO_B

OS

IO DRIVER FOR COMPANY B

INPUT MODULE

OUTPUT MODULE

DCN2

| DCN VENDOR | CONTROLLER | IP ADDRESS | INPUT/ OUTPUT INFORMATION | PERFORMANCE | ... |
|---|---|---|---|---|---|
| COMPANY A | CONTROLLER DCN-A001 | XXX.XXX. AAA. 001 | CH1: AO<br>CH2: AO<br>CH3: DO | ALARM AL2.00<br>... | ... |
| | ... | ... | ... | ... | ... |
| COMPANY B | CONTROLLER DCN-B001 | XXX.XXX. BBB. 001 | CH1: AI<br>CH2: DI<br>CH3: DO | ALARM AL1.00<br>... | ... |
| | ... | ... | ... | ... | ... |
| ... | ... | ... | ... | ... | ... |

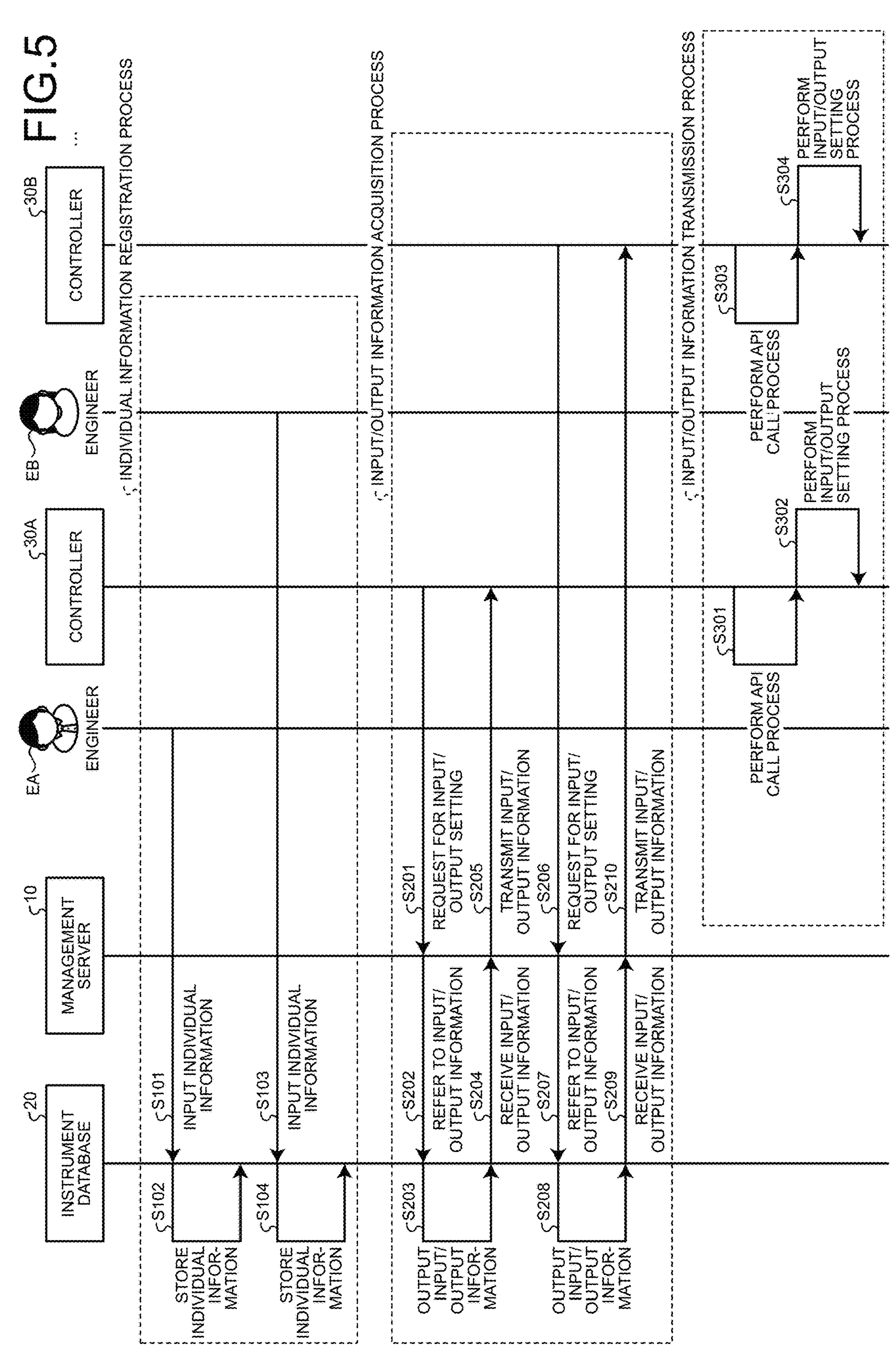
FIG.5
20
INSTRUMENT DATABASE
10
MANAGEMENT SERVER
EA
ENGINEER
30A
CONTROLLER
EB
ENGINEER
30B
CONTROLLER
...
INDIVIDUAL INFORMATION REGISTRATION PROCESS
S101
INPUT INDIVIDUAL INFORMATION
S102
STORE INDIVIDUAL INFOR-MATION
S103
INPUT INDIVIDUAL INFORMATION
S104
STORE INDIVIDUAL INFOR-MATION
INPUT/OUTPUT INFORMATION ACQUISITION PROCESS
S201
REQUEST FOR INPUT/OUTPUT SETTING
S202
REFER TO INPUT/OUTPUT INFORMATION
S203
OUTPUT INPUT/OUTPUT INFOR-MATION
S204
RECEIVE INPUT/OUTPUT INFORMATION
S205
TRANSMIT INPUT/OUTPUT INFORMATION
S206
REQUEST FOR INPUT/OUTPUT SETTING
S207
REFER TO INPUT/OUTPUT INFORMATION
S208
OUTPUT INPUT/OUTPUT INFOR-MATION
S209
RECEIVE INPUT/OUTPUT INFORMATION
S210
TRANSMIT INPUT/OUTPUT INFORMATION
INPUT/OUTPUT INFORMATION TRANSMISSION PROCESS
S301
PERFORM API CALL PROCESS
S302
PERFORM INPUT/OUTPUT SETTING PROCESS
S303
PERFORM API CALL PROCESS
S304
PERFORM INPUT/OUTPUT SETTING PROCESS

CONTROLLER, SETTING METHOD, COMPUTER-READABLE RECORDING MEDIUM, AND INFORMATION PROCESSING APPARATUS

CROSS-REFERENCE TO RELATED APPLICATION

The present application claims priority to and incorporates by reference the entire contents of Japanese Patent Application No. 2023-170180 filed in Japan on Sep. 29, 2023.

FIELD

The present invention relates to a controller, a setting method, a computer-readable recording medium, and an information processing apparatus.

BACKGROUND

Processes for manufacturing various products are automated in a plant by installing an automation system. In the case where a project related to such an automation system is executed, engineering, such as designing, construction, and testing, is performed on the basis of design information received from a customer.

However, in a conventional method, it is difficult to efficiently perform engineering on an automation system in a plant. For example, in a conventional method, it is difficult to efficiently perform input/output setting (hereinafter, appropriately referred to as "IO (input/output) setting") of data onto a plurality of control systems that constitute the automation system in the plant.

Accordingly, the present invention has been conceived in light of the circumstances described above and an object thereof is to efficiently perform engineering related to input/output setting of data in an automation system.

SUMMARY

According to an aspect of the embodiments, a controller includes a transmission/reception unit that transmits a request for input/output setting of data to an information processing apparatus, and that receives, from the information processing apparatus, input/output information that defines the input/output setting and that is associated with the controller that performs control of an associated system, and a setting unit that performs the input/output setting of the own instrument based on the received input/output information.

According to an aspect of the embodiments, a setting method executed by a computer, the setting method includes transmitting a request for input/output setting of data to an information processing apparatus, receiving, from the information processing apparatus, input/output information that defines the input/output setting and that is associated with a controller that performs control of an associated system, and performing the input/output setting on the own instrument based on the received input/output information.

According to an aspect of the embodiments, a computer-readable recording medium having stored therein a setting program that causes a computer to execute a process includes transmitting a request for input/output setting of data to an information processing apparatus, receiving, from the information processing apparatus, input/output information that defines the input/output setting and that is associated with a controller that performs control of an associated system, and performing the input/output setting of the own instrument based on the received input/output information.

According to an aspect of the embodiments, an information processing apparatus includes an acquisition unit that acquires, in a case where the acquisition unit has accepted a request for input/output setting of data in a controller that performs control of a system, input/output information that defines the input/output setting and that is associated with the controller, and a transmission unit that transmits the input/output information to the controller in which the request has been accepted.

BRIEF DESCRIPTION OF THE DRAWINGS

FIG. 2 is a diagram illustrating a specific example of each process performed in the automation system according to the embodiment;

FIG. 4 is a diagram illustrating an individual information storage unit stored in an instrument database according to the embodiment;

FIG. 5 is a sequence diagram illustrating one example of the overall flow of a process performed in the automation system according to the embodiment.

DETAILED DESCRIPTION OF THE PREFERRED EMBODIMENTS

Preferred embodiments of a controller, a setting method, a computer-readable recording medium, and an information processing apparatus according to the present invention will be explained in detail below with reference to the accompanying drawings. Furthermore, the present invention is not limited to the embodiments described below.

Embodiment

In the following, a configuration and a process related to an automation system 100 according to an embodiment, a configuration and a process related to each device included in the automation system 100, and the flow of the process performed in the automation system 100 will be described in this order, and, at the end, effects of the embodiment will be described.

1. Configuration and Process Related to Automation System 100

Figure 1:
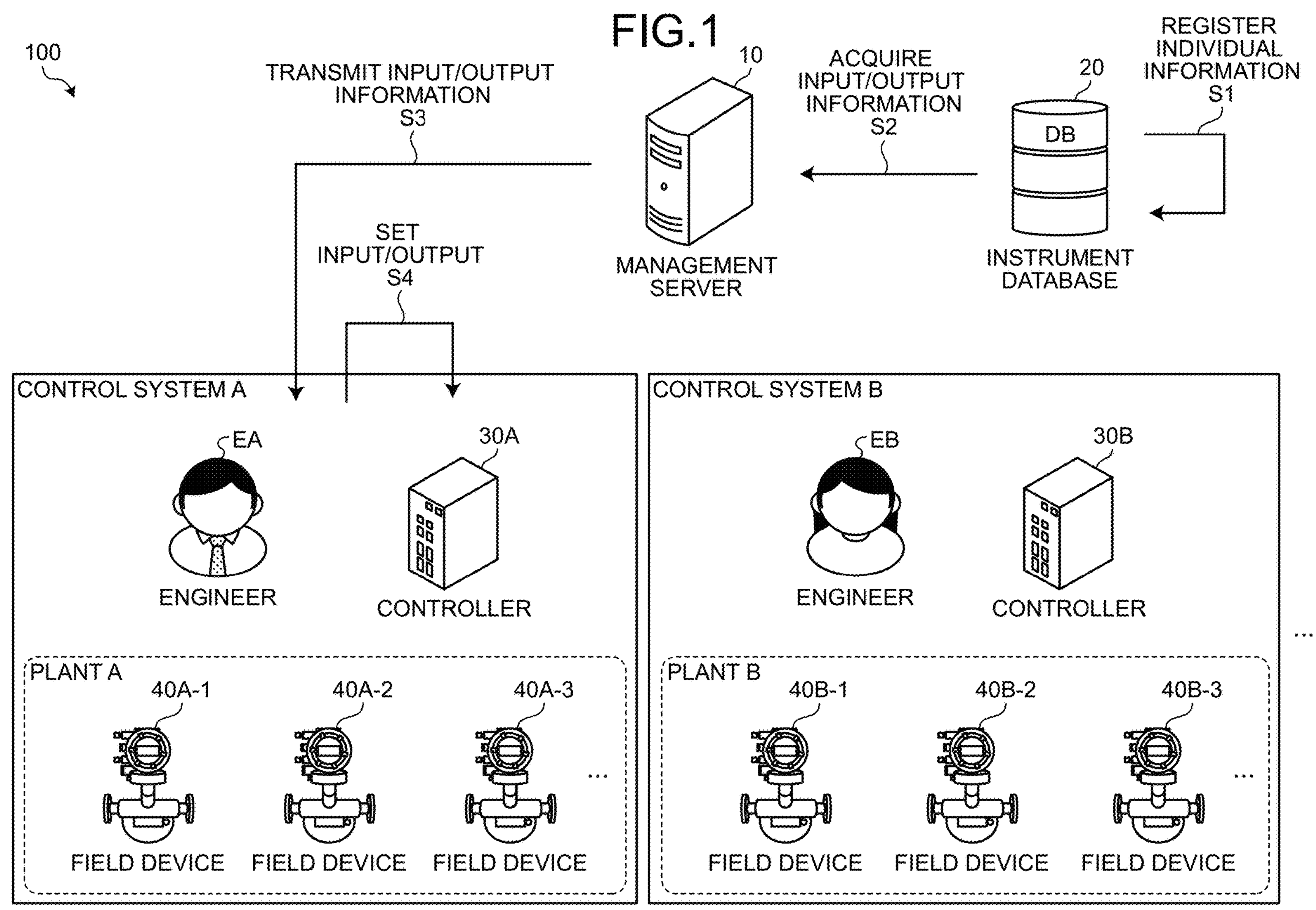
FIG. 1 is a diagram illustrating a configuration example and a process example of an automation system according to an embodiment.

A configuration and a process related to the automation system 100 according to the embodiment will be described in detail with reference to FIG. 1. FIG. 1 is a diagram illustrating a configuration example and a process example related to the automation system 100 according to the embodiment. In the following, an example of the overall configuration of the automation system 100, an example of the overall process of the automation system 100, a specific example of each of the processes performed in the automation system 100, and the effects of the automation system 100 will be described. Furthermore, in the embodiment, plant production monitoring performed by using plant instruments corresponding to devices that are installed in a plant will be described as one example, but the example is not intended to limit devices and fields of application. The example may also be used for environmental measurement monitoring, such as electrical power monitoring, wind power generation, water supply and sewerage monitoring, and river monitoring.

1-1. Example of Overall Configuration of Automation System 100

The automation system 100 includes a management server 10 that is an information processing apparatus, an instrument database 20, a controller 30 (30A, 30B, and . . . ) that is a setting device, and a field instrument 40 (40A, 40B, and . . . ). Here, the management server 10, the instrument database 20, the controller 30, and the field instrument 40 are connected to one another via a predetermined communication network (not illustrated) so as to be able to communicate each other in a wired or wireless manner. Furthermore, various kinds of communication networks, such as the Internet or a dedicated line, may be used for the predetermined communication network.

1-1-1. Management Server 10

The management server 10 is the information processing apparatus that manages at least one of control systems. For example, the management server 10 is implemented by a global discovery server (GDS) that manages a control system conforming to Open Platform Communications Unified Architecture (OPC UA), a Hypertext Transfer Protocol (HTTP) server having a client function of OPC UA, or the like. Furthermore, two or more of the management servers 10 may be included in the automation system 100 illustrated in FIG. 1. Moreover, the management server 10 may be implemented in a cloud environment, an on-premise environment, an edge environment, or the like.

Here, the control system is a system that controls the processes performed in the plant, and that is constituted by, in addition to the controller 30, the field instrument 40 and the like that are controlled by the controller 30. For example, the control system is implemented by a distributed control node (DCN) that is a control controller, an instrument group that manages the DCN, and an instrument group that is managed by the DCN. In the example illustrated in FIG. 1, a plurality of control systems including a control system A that controls processes performed in a plant A, a control system B that controls processes performed in a plant B, . . . , and the like. Furthermore, the plant is, for example, a production facility of petroleum, petrifaction, gas, ferrous metals, nonferrous metals, chemical substances, electrical power, medicine from food, or the like.

1-1-2. Instrument Database 20

The instrument database 20 is a storage device that stores therein individual information on at least one of the control systems, and is implemented by a database server or the like that is installed in a cloud environment. Furthermore, the instrument database 20 may be implemented by being supported by representational state transfer (REST) in order to have a configuration that is separated from the management server 10. Moreover, the automation system 100 illustrated in FIG. 1 may include two or more of the instrument databases 20. In addition, the instrument database 20 may be constituted to be integrated with the management server 10.

1-1-3. Controller 30

The controller 30 is a plant instrument that controls two or more of the field instruments 40 that constitute the plant, and that is a setting device. For example, the controller 30 is implemented by a control controller. Furthermore, the controller 30 is managed by an engineer E (EA, EB, and . . . ) who performs maintenance or an inspection of the control system in the plant. In the example illustrated in FIG. 1, the controller 30A that constitutes the control system A is managed by an engineer EA. Furthermore, the controller 30B that constitutes the control system B is managed by an engineer EB.

1-1-4. Field Instrument 40

The field instrument 40 is a plant instrument that constitutes a plant. For example, the field instrument 40 is implemented by a measurement instrument, such as a temperature sensor, a pressure sensor, or a flow rate sensor, or an actuating instrument, such as an actuator. In the example illustrated in FIG. 1, the field instrument 40A constituting the plant A includes a field instrument 40A-1, a field device 40A-2, a field device 40A-3, . . . , and the like. Furthermore, the field device 40B constituting the plant B includes a field device 40B-1, a field device 40B-2, a field device 40B-3, . . . , and the like.

1-2. Example of Overall Process of Automation System 100

The overall process performed in the automation system 100 described above will be described. Moreover, the processes performed at Steps S1 to S4 described below may be performed in different order. Furthermore, some of the processes performed at Steps S1 to S4 described below may be omitted.

1-2-1. Individual Information Registration Process

At a first step, the instrument database 20 registers individual information (Step S1). For example, the instrument database 20 accepts and stores the individual information on each of the control systems that has been input by the engineer E via an engineer terminal.

Here, the individual information is information on individual controllers that are set in an associated manner with control systems in the plant, and is information including, for example, a vendor name of the control system, an instrument name of the controller 30 constituting the control system, an Internet Protocol (IP) address, input/output information, performance of the control system, and the like.

1-2-2. Input/Output Information Acquisition Process

At a second step, the management server 10 acquires input/output information from the instrument database 20 (Step S2). For example, the management server 10 accepts an input/output setting request sent from the controller 30A from the controller 30A that constitutes the control system A, refers to the individual information stored in the instrument database 20, and acquires the input/output information on the controller 30A.

Here, the input/output information is information that defines the input/output setting and that is associated with each of the controllers 30, and is, for example, an input/output type of data passing through each of the input/output channels of the controllers 30. Furthermore, examples of the input/output type include "Analog Input (AI)", "Analog Output (AO)", "Digital Input (DI)", and "Digital Output (DO)".

Furthermore, the controller 30 transmits an input/output setting request to the management server 10 when the controller 30 is connected to the communication network including the management server 10 for the first time, or, when the controller 30 is connected to the communication network including the management server 10 after a system configuration has been changed. In the example illustrated in FIG. 1, the controller 30A transmits the input/output setting request to the management server 10 at the time of initial connection of the controller 30A, or, at the time of constitution change of the field device 40A that is connected to the controller 30A.

1-2-3. Input/Output Information Transmission Process

At a third step, the management server 10 transmits the input/output information to the controller 30 (Step S3). The management server 10 transmits the input/output information {CH1: AO, CH2: AO, CH3: DO, and . . . } on the controller 30A to the controller 30A that has transmitted the input/output setting request.

1-2-4. Input/Output Setting Process

At a fourth step, the controller 30 sets an input/output of data to and from the controller 30 (Step S4). For example, the controller 30A constituting the control system A performs an application programming interface (API) call in order to perform input/output setting of the data, calls a setting API that is needed for the input/output setting for each system vendor, and performs setting of an input/output module.

In the example illustrated in FIG. 1, the controller 30A sets "AO" in an input/output channel 1, sets "AO" in an input/output channel 2, and sets "DO" in an input/output channel 3 of the respective input/output modules.

1-3. Specific Example of Each Process Performed in Automation System 100

In the following, a specific example of each of the processes performed in the automation system 100 will be described with reference to FIG. 2. FIG. 2 is a diagram illustrating a specific example of each of the processes performed in the automation system 100 according to the embodiment. In the example illustrated in FIG. 2, the controller 30A provided by a system vendor of "company A" is denoted by a "DCN 1", whereas the controller 30B provided by a system vendor of "company B" is denoted by a "DCN 2", and it is assumed that the input/output information on the "DCN 1" provided by the "company A" is {CH1: AO, CH2: AO, and CH3: DO}, and the input/output information on the "DCN 2" provided by the "company B" is {CH1: AI, CH2: DI, and CH3: DO}.

Furthermore, in the example illustrated in FIG. 2, each of the "DCN 1" and the "DCN 2" includes an "OPA server" as an application including a common API that is used for the input/output setting. Here, the "OPA server" includes an "IO driver I/F" that is an interface conforming to the standards of open process automation (OPA) corresponding to a global standards organization.

Furthermore, in the automation system 100, in order for the "DCN 1" and the "DCN 2" to join a network, the individual information (an IP address, the performance (Capability) of the OPC UA, etc.) on the controller 30 is registered in the instrument database 20, and is managed.

At a first step, as indicated by (1) illustrated in FIG. 2, the "DCN 1" transmits an input/output setting request of the "DCN 1" to the management server 10 via the "OPA server" included in the "DCN 1". Similarly, the "DCN 2" transmits an input/output setting request of the "DCN 2" to the management server 10 via the "OPA server" included in the "DCN 2".

At a second step, as indicated by (2) illustrated in FIG. 2, in a case where the management server 10 accepts the input/output setting request of the "DCN 1", the management server 10 acquires the input/output information on the "DCN 1" from the instrument database 20. Similarly, in a case where the management server 10 accepts the input/output setting request of the "DCN 2", the management server 10 acquires the input/output information on the "DCN 2" from the instrument database 20.

At a third step, as indicated by (3) illustrated in FIG. 2, the management server 10 transmits the acquired input/output information on the "DCN 1" to the "DCN 1". Similarly, the management server 10 transmits the acquired input/output information on the "DCN 2" to the "DCN 2".

At a fourth step, as indicated by (4) illustrated in FIG. 2, the "DCN 1" calls, which is performed in the "OPA server" included in the "DCN 1", "SetIO" that is an input/output setting API common to the vendors on the basis of the input/output information of {CH1: AO, CH2: AO, and CH3: DO} on the "DCN 1". At this time, the "DCN 1" calls "SetIO A" that is an input/output setting API for each vendor, and performs input/output setting of the "input module" or the "output module" by using the IO driver to be used for the "company A". Therefore, as a result of the interface for the API being provided, the "DCN 1" is able to call the driver without depending on the system vendor.

Similarly, the "DCN 2" calls, which is performed in the "OPA server" included in the "DCN 2", "SetIO" that is the input/output setting API common to the vendors on the basis of the input/output information of {CH1: AI, CH2: DI, and CH3: DO} on the "DCN 2". At this time, the "DCN 2" calls "SetIO B" that is the input/output setting API for each vendor, and performs input/output setting of the "input module" or the "output module" by using the IO driver to be used for the "company B". Therefore, as a result of the interface for the API being provided, the "DCN 2" is able to call the driver without depending on the system vendor.

Furthermore, in the example described above, both of the "DCN 1" and the "DCN 2" set "DO" in the "CH3", but each of the IO drivers included in the "company A" and "company B" uses a different setting method. For example, the "DCN 1" performs "SetIO A" associated with the "CH3: DO", and then, performs the input/output setting. In contrast, the "DCN 2" performs "SetIO B" associated with the "CH3: DO", and then, performs the input/output setting. However, the "OPA server" calls the "SetIO" corresponding to the common API in both cases. As a result of this, when the system vendor performs the input/output setting from the "OPA server" and the automation system, the system vendor does not need to separately generate the "OPA server" to be used for the "company A" and the "OPA server" to be used for the "company B".

In order to perform the above described process indicated by (4) illustrated in FIG. 2, for example, each of the system vendors may set an association between the common API and the API for each vendor when each of the "OPA servers" is built, and install the associated data in each of the DCNs. Furthermore, each of the system vendors may associate the common API with the API for each vendor at the time of setting of the "OPA server" after the "OPA server" has been installed in each of the DCNs.

1-4. Effects of Automation System 100

In the following, problems of an automation system 100P according to a reference technology will be described, and then effects of the automation system 100 will be described.

1-4-1. Problems of Automation System 100P

In the automation system 100P, a shift to OPC UA that is the standard specifications is progressed, but control systems including DCNs and the like provided by a plurality of vendors exist together. In the above described environment, there is a need to individually set input/output setting of a controller 30P according to the reference technology by each system vendor, so that a huge number of man-hours is needed for engineering in a case where a large number of controllers 30P is used.

1-4-2. Outline of Automation System 100

In the automation system 100, the following processes are performed. At a first step, the instrument database 20 registers individual information for defining input/output setting of each of the controllers 30. At a second step, the management server 10 acquires the input/output information from the instrument database 20 in accordance with the input/output setting request received from the controller 30. At a third step, the management server 10 transmits the input/output information to the controller 30 that has sent the request for the input/output setting. At a fourth step, the controller 30 sets an input/output of data into the controller 30 by using the received input/output information.

At this time, in the automation system 100, each of the controllers 30 performs the input/output setting, by using the IO drivers that are used for the input/output setting and that are provided by the respective system vendors, by way of an application or the like having a common technique for the input/output setting installed in the controller 30.

1-4-3. Effects of Automation System 100

As described above, in the automation system 100, in the environment in which the controllers 30 provided by the plurality of vendors exist together, it is possible to automate the input/output setting of each of the controllers 30, and reduce the number of man-hours needed for engineering performed by the engineer E. In other words, the automation system 100 is able to efficiently perform the engineering related to the input/output setting of the data in the automation system in the plant while preventing a human error.

2. Configuration and Process Performed by Each Device In Automation System 100

Figure 3:
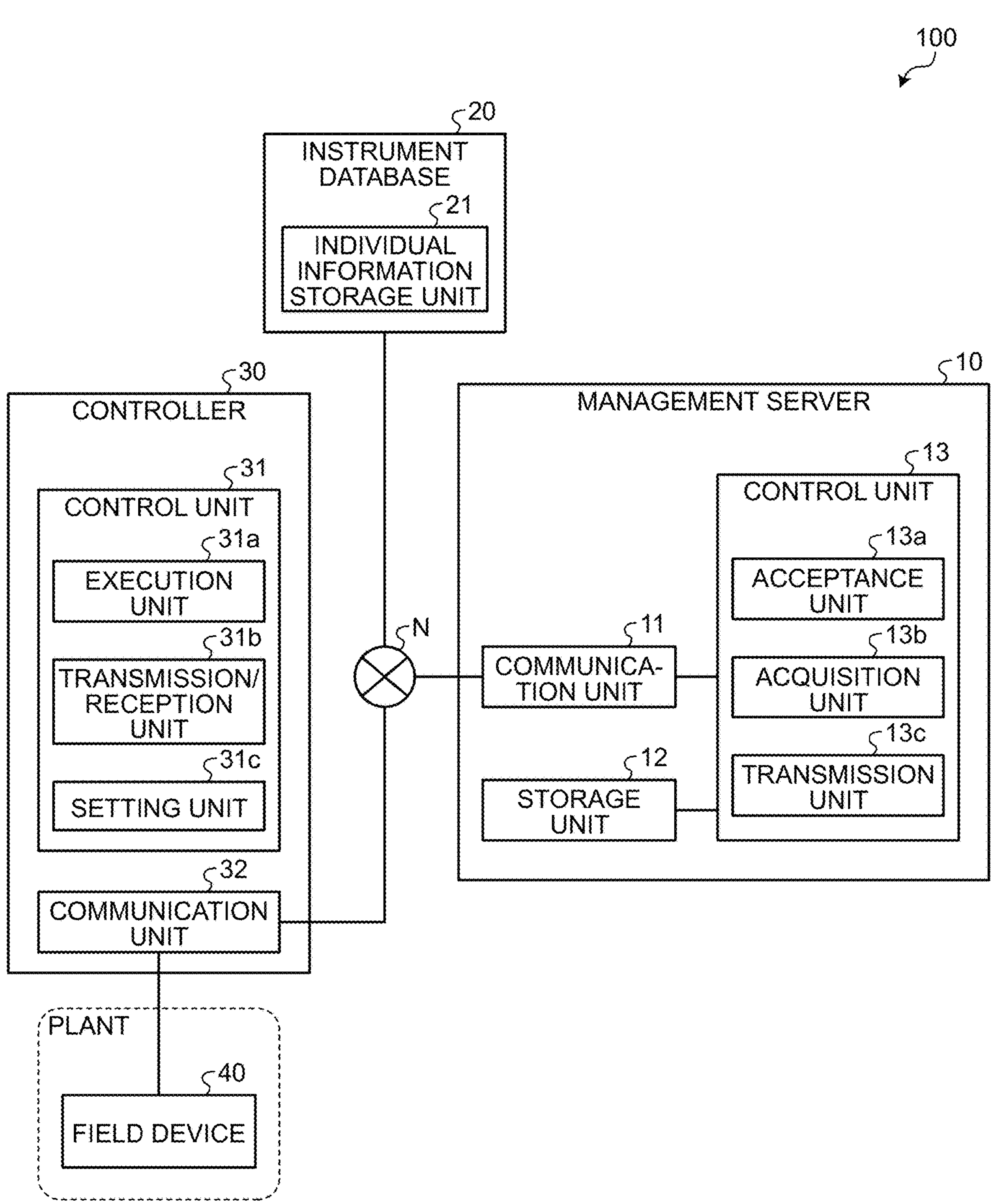
FIG. 3 is a block diagram illustrating a configuration example of each device performed in the automation system according to the embodiment.

A configuration and a process of each of the devices included in the automation system 100 illustrated in FIG. 1 will be described with reference to FIG. 3. FIG. 3 is a block diagram illustrating a configuration example of each of the devices included in the automation system 100 according to the embodiment. In the following, an example of the overall configuration of the automation system 100 according to the embodiment will be described first, and then, a configuration example and a process example of the management server 10, a configuration example and a process example of the instrument database 20, a configuration example and a process example of the controller 30, and a configuration example and a process example of the field device 40 will be described in detail.

2-1. Example of Overall Configuration of Automation System 100

An example of the overall configuration of the automation system 100 illustrated in FIG. 1 will be described with reference to FIG. 3. As illustrated in FIG. 3, the automation system 100 includes the management server 10 that is an information processing apparatus, the instrument database 20, the controller 30 that is a setting device, and the field device 40. Furthermore, the management server 10, the instrument database 20, the controller 30, and the field device 40 are connected to one another by a communication network N that is implemented by the Internet, a dedicated line, or the like so as to be able to communicate each other.

At this time, the management server 10 may be implemented by a cloud environment, an on-premise environment, an edge environment, or the like. Furthermore, the controller 30 and the field device 40 constitute a control system that controls a system. Here, the system is, for example, a plant. Furthermore, the control system performs control of, for example, the plant. The field device 40 is installed in a plant site.

Furthermore, the controller 30 conforms to the standard of, for example, the OPA, MTP (Module Type Package), or NAMUR Open Architecture (NOA).

Furthermore, the controller 30 conforms to the standard of, for example, the OPC UA.

2-2. Configuration Example and Process Example of Management Server 10

A configuration example and a process example of the management server 10 will be described with reference to FIG. 3. The management server 10 is an information processing apparatus, and includes a communication unit 11, a storage unit 12, and a control unit 13. Moreover, the management server 10 may include an input unit (for example, a keyboard, a mouse, etc.) that receives various kinds of operations from an administrator of the management server 10, and a display unit (for example, a liquid crystal display, etc.) for displaying various kinds of information.

2-2-1. Communication Unit 11

The communication unit 11 manages data communication with another device. For example, the communication unit 11 performs data communication with each of the communication devices via a router, or the like. Furthermore, the communication unit 11 is able to perform data communication with a terminal that is used by an operator (not illustrated).

2-2-2. Storage Unit 12

The storage unit 12 stores therein various kinds of information that are referred to by the control unit 13 at the time of operation performed by the control unit 13, and stores therein various kinds of information acquired by the control unit 13. Here, the storage unit 12 may be implemented, by for example, a semiconductor memory device, such as a random access memory (RAM) or a flash memory, or a storage device, such as a hard disk or an optical disk. Moreover, in the example illustrated in FIG. 3, the storage unit 12 is installed in the management server 10; however, the storage unit 12 may be installed outside the management server 10, or a plurality of storage units may be installed. Furthermore, the storage unit 12 may store the individual information that is stored by an individual information storage unit 21 included in the instrument database 20 that will be described later.

2-2-3. Control Unit 13

The control unit 13 manages the overall control of the management server 10. The control unit 13 includes an acceptance unit 13*a*, an acquisition unit 13*b*, and a transmission unit 13*c*. Here, the control unit 13 is implemented by, for example, an electronic circuit, such as a central processing unit (CPU) or a micro processing unit (MPU), or an integrated circuit, such as an application specific integrated circuit (ASIC) or a field programmable gate array (FPGA).

2-2-3-1. Acceptance Unit 13*a*

The acceptance unit 13*a* accepts various kinds of information. Furthermore, the acceptance unit 13*a* may store the accepted various kinds of information in the storage unit 12. For example, the acceptance unit 13*a* accepts, from the controller 30, a request for the input/output setting of the data in the controller 30 that performs control of the system. Furthermore, when the controller 30 is connected to the communication network including the management server 10 for the first time, the acceptance unit 13*a* accepts a request for the input/output setting of the data transmitted from the controller 30. Furthermore, when the controller 30 is connected to the communication network including the management server 10 after the system configuration has been changed, the acceptance unit 13*a* accepts a request for the input/output setting of the data that is transmitted from the controller 30.

As a specific example, the acceptance unit 13*a* accepts an input/output setting request including an IP address "XXX.XXX.AAA.001" of the controller 30A transmitted from the controller 30A at the time of initial setting of the controller 30A that is included in the control system A. Furthermore, the acceptance unit 13*a* accepts an input/output setting request including an IP address "XXX.XXX.BBB.001" of the controller 30B transmitted from the controller 30B after replacement of the field device 40B that is included in the control system B.

2-2-3-2. Acquisition Unit 13*b*

The acquisition unit 13*b* receives various kinds of information. Furthermore, the acquisition unit 13*b* may store the acquired various kinds of information in the storage unit 12. For example, in a case where the acquisition unit 13*b* accepts a request for the input/output setting of the data in the controller 30 that performs control of the system, the acquisition unit 13*b* acquires the input/output information that defines the input/output setting and that is associated with each of the controllers 30.

Furthermore, the acquisition unit 13*b* acquires the input/output information that defines an input/output type of the data passing through each of the input/output channels of the controllers 30 and that is associated with the identification information on each of the controllers 30. At this time, in a case where the acquisition unit 13*b* accepts a request for the input/output setting of the data in the controller 30, the acquisition unit 13*b* refers to a predetermined database that stores therein the input/output information, and acquires the input/output information that is associated with the identification information on the controller 30 in which the request has been accepted from among the pieces of input/output information associated with the respective pieces of identification information on the respective controllers 30. Here, the identification information is, for example, an IP address, but is not particularly limited as long as the information is information that is used for identifying the controller 30.

As a specific example, in a case where the acquisition unit 13*b* accepts the input/output setting request including the IP address "XXX.XXX.AAA.001" of the controller 30A from the controller 30A included in the control system A, the acquisition unit 13*b* refers to the individual information storage unit 21 included in the instrument database 20, and acquires the input/output information of {CH1: AO, CH2: AO, CH3: DO, and . . . } that is related to the controller 30A and that is associated with the IP address "XXX.XXX.AAA.001" of the controller 30A. Furthermore, in a case where the acquisition unit 13*b* accepts the input/output setting request including the IP address "XXX.XXX.BBB.001" of the controller 30B from the controller 30B included in the control system B, the acquisition unit 13*b* refers to the individual information storage unit 21 included in the instrument database 20, and acquires the input/output information of {CH1: AI, CH2: DI, CH3: DO, and . . . } that is related to the controller 30B and that is associated with the IP address "XXX.XXX.BBB.001" of the controller 30B.

Furthermore, in a case where the acquisition unit 13*b* accepts a request for the input/output setting of the data that is transmitted from the controller 30 and that is transmitted when the controller 30 is connected to the communication network including the management server 10 for the first time, or when the controller 30 is connected to the communication network after the system configuration has been changed, the acquisition unit 13*b* acquires the input/output information.

As a specific example, in a case where the acceptance unit 13*a* accepts the input/output setting request including the IP address "XXX.XXX.AAA.001" of the controller 30A transmitted from the controller 30A at the time of initial setting of the controller 30A included in the control system A, the acceptance unit 13*a* refers to the individual information storage unit 21 included in the instrument database 20, and acquires the input/output information of {CH1: AO, CH2: AO, CH3: DO, and . . . } on the controller 30A included in the control system A. Furthermore, in a case where the acceptance unit 13*a* accepts the input/output setting request including the IP address "XXX.XXX.BBB.001" of the controller 30B transmitted from the controller 30B after replacement of the field device 40B included in the control system B, the acceptance unit 13*a* refers to the individual information storage unit 21 included in the instrument database 20, and acquires the input/output information of {CH1: AI, CH2: DI, CH3: DO, and . . . } on the controller 30B included in the control system B.

2-2-3-3. Transmission Unit 13*c*

The transmission unit 13*c* transmits various kinds of information. Moreover, the transmission unit 13*c* acquires various kinds of information acquired by the acquisition unit 13*b*. Furthermore, the transmission unit 13*c* acquires various kinds of information stored in the storage unit 12. For example, the transmission unit 13*c* transmits the input/output information to the controller 30 in which the request for the input/output setting of the data has been accepted.

As a specific example, in a case where the transmission unit 13*c* accepts the input/output setting request from the controller 30A included in the control system A, the transmission unit 13*c* transmits the input/output information of {CH1: AO, CH2: AO, CH3: DO, and . . . } on the controller 30A included in the control system A to the controller 30A. Furthermore, in a case where the transmission unit 13*c* accepts the input/output setting request from the controller 30B included in the control system B, the transmission unit 13*c* transmits the input/output information of {CH1: AI, CH2: DI, CH3: DO, and . . . } on the controller 30B included in the control system B to the controller 30B.

2-3. Configuration Example and Process Example of Instrument Database 20

A configuration example and a process example of the instrument database 20 will be described with reference to FIG. 3. The instrument database 20 is a storage device, and includes the individual information storage unit 21. Here, the individual information storage unit 21 may be implemented by, for example, a semiconductor memory device, such as a RAM or a flash memory, or a storage device, such as a hard disk or an optical disk. Moreover, the instrument database 20 may be constituted to be integrated with the management server 10 described above.

2-3-1. Individual Information Storage Unit 21

The individual information storage unit 21 stores therein the individual information. For example, the individual information storage unit 21 stores therein the individual information including the input/output information on each of the individual control systems that have been input by the engineer E via the engineer terminal. Here, one example of the data stored in the individual information storage unit 21 will be described with reference to FIG. 4. FIG. 4 is a diagram illustrating one example of the individual information storage unit 21 included in the instrument database 20 according to the embodiment. In the example illustrated in FIG. 4, the individual information storage unit 21 includes items, such as "DCN vendor", "controller", "IP address", "input/output information", and "performance".

The "DCN vendor" indicates identification information for identifying a system vendor that provides a control system and is, for example, a company name of the system vendor, or the like. The "controller" indicates identification information for identifying the controller 30 that constitutes a control system and is, for example, an identification number or an identification symbol of the controller 30. The "IP address" indicates identification information for identifying the controller 30 on the communication network and is, for example, an identification number or an identification symbol allocated to the controller 30. The "input/output information" is information that defines input/output setting and that is associated with each of the controllers 30, and is, for example, an input/output type (for example: "AI", "AO", "DI", or "DO") of the data in each of the input/output channels of the associated controllers 30 that constitute the control system. The "performance" indicates the performance of the control system and is, for example, the standard of an alarm or version information related to the control system.

In other words, FIG. 4 illustrates an example in which data of {controller: "controller DCN-A001", IP address "XXX.XXX.AAA.001", input/output information: "CH1: AO/CH2: AO/CH3: DO", performance: "alarm AL2.00", and . . . } related to the DCN vendor identified by the "company A", and data of {controller: "controller DCN-B001", IP address "XXX.XXX.BBB.001", input/output information: "CH1: AI/CH2: DI/CH3: DO", performance: "alarm AL1.00", and . . . } related to the DCN vendor identified by the "company B", and the like are stored in the individual information storage unit 21.

2-4. Configuration Example and Process Example of Controller 30

A configuration example and a process example of the controller 30 will be described with reference to FIG. 3. The controller 30 is a setting device that controls a plurality of instruments constituting the control system, and includes a control unit 31 and a communication unit 32.

2-4-1. Control Unit 31

The control unit 31 manages the overall control of the controller 30. The control unit 31 includes an execution unit 31*a*, a transmission/reception unit 31*b*, and a setting unit 31*c*. Here, the control unit 31 may be implemented by, for example, an electronic circuit, such as a CPU or an MPU, or an integrated circuit, such as an ASIC or an FPGA.

2-4-1-1. Execution Unit 31*a*

The execution unit 31*a* performs various kinds of control. For example, the execution unit 31*a* collects measurement values from the field devices 40 constituting the control system. Furthermore, the execution unit 31*a* may calculate a calculation value from the measurement values collected from the field device 40. Furthermore, the execution unit 31*a* controls the field device 40 by transmitting a control signal.

2-4-1-2. Transmission/Reception Unit 31*b*

The transmission/reception unit 31*b* performs transmission and reception of various kinds of information. For example, the transmission/reception unit 31*b* transmits a request for the input/output setting of the data in the controller 30 to the management server 10. Furthermore, the transmission/reception unit 31*b* receives the input/output information transmitted from the management server 10.

At this time, the transmission/reception unit 31*b* transmits a request for the input/output setting of the data to the management server 10, and receives, from the management server 10, the input/output information that defines the input/output setting and that is associated with each of the controllers 30 that performs control of the associated systems. Furthermore, the transmission/reception unit 31*b* receives the input/output information that defines the input/output type of the data in each of the input/output channels of the controllers 30 and that is associated with the respective pieces of identification information on the controllers 30.

As a specific example, the transmission/reception unit 31*b* transmits the input/output setting request including the IP address "XXX.XXX.AAA.001" of the controller 30A in the control system A to the management server 10, and receives the input/output information of {CH1: AO, CH2: AO, CH3: DO, and . . . } on the controller 30A that is associated with the IP address "XXX.XXX.AAA.001" of the controller 30A transmitted from the management server 10 that has received the input/output setting request. Furthermore, the transmission/reception unit 31*b* transmits the input/output setting request including the IP address "XXX.XXX.BBB.001" of the controller 30B in the control system B to the management server 10, and receives the input/output information of {CH1: AI, CH2: DI, CH3: DO, and . . . } on the controller 30B that is associated with the IP address "XXX.XXX.BBB.001" of the controller 30B transmitted from the management server 10 that has received the input/output setting request.

Furthermore, the transmission/reception unit 31*b* transmits a request for the input/output setting of the data to the management server 10 when the controller 30 is connected to the communication network including the management server 10 for the first time, or when the control system including the controller 30 is connected to the communication network including the management server 10 after the system configuration has been changed.

As a specific example, the transmission/reception unit 31*b* transmits the IP address "XXX.XXX.AAA.001" of the controller 30A to the management server 10 at the time of initial setting of the controller 30A in the control system A. Furthermore, the transmission/reception unit 31*b* transmits the input/output setting request including the IP address "XXX.XXX.BBB.001" of the controller 30B to the management server 10 after the field device 40B in the control system B has been replaced.

2-4-1-3. Setting Unit 31*c*

The setting unit 31*c* performs various kinds of setting. The setting unit 31*c* calls the API associated with the input/output setting by using the input/output information, and sets the input/output module of the controller 30. At this time, in a case where the setting unit 31*c* receives the input/output information from the management server 10 to which the request for the input/output setting of the data has been transmitted, the setting unit 31*c* calls the API associated with the input/output setting by using the input/output information, and performs setting of the input/output module in the controller 30 that is the own instrument. Furthermore, the setting unit 31*c* calls the API that is common to the systems and that is related to the input/output setting by using the input/output information, further calls the API that is associated with the input/output setting that is different for each system, and performs setting of the input/output module in the controller 30 that is the own instrument.

As a specific example, the setting unit 31*c* performs setting of the input/output module in the controller 30A in the control system A by performing an API call using the input/output information on the controller 30A in the control system A received from the management server 10, calling a setting API of the "company A" associated with the common API after calling the common API that is common to the control systems, and performing driver "Driver-A-AO" for the "company A" needed for the input/output setting to be performed on the channel 1 of the controller 30A, driver "Driver-A-AO" for the "company A" needed for the input/output setting to be performed on the channel 2 of the controller 30A, and driver "Driver-A-DO" for the "company A" needed for the input/output setting to be performed on the channel 3 of the controller 30A.

Furthermore, the setting unit 31*c* performs setting of the input/output module in the controller 30B in the control system B by performing an API call using the input/output information on the controller 30B in the control system B received from the management server 10, calling a setting API of the "company B" associated with the common API after calling the common API that is common to the control systems, and performing driver "Driver-B-AI" for the "company B" needed for the input/output setting to be performed on the channel 1 of the controller 30B, driver "Driver-B-DI" for the "company B" needed for the input/output setting to be performed on the channel 2 of the controller 30B, and driver "Driver-B-DO" for the "company B" needed for the input/output setting to be performed on the channel 3 of the controller 30B.

2-4-2. Communication Unit 32

The communication unit 32 manages data communication with another device. For example, the communication unit 32 performs data communication with each of the communication devices via a router, or the like. Furthermore, the communication unit 32 is able to perform data communication with a terminal used by an operator (not illustrated).

2-5. Field Device 40

A configuration example and a process example of the field device 40 will be described with reference to FIG. 3. The field device 40 is a measurement instrument, such as a sensor instrument, constituting the control system, and measures a sensor value or a process value. At this time, the field device 40 transmits the measured sensor value or the measured process value as a measurement value to the controller 30 constituting the control system.

Furthermore, the field device 40 is an actuating instrument, such as an actuator, constituting the control system, and performs process control of, for example, opening and closing a valve in accordance with the control signal received from the controller 30 constituting the control system.

3. Flow of Each Process Performed in Automation System 100

The overall flow of the process performed in the automation system 100 according to the embodiment will be described with reference to FIG. 5. FIG. 5 is a sequence diagram illustrating one example of the overall flow of the process performed in the automation system 100 according to the embodiment. In the following, an individual information registration process, an input/output information acquisition process, and an input/output information setting process will be described in this order.

3-1. Overall Flow of Process Performed in Automation System 100

In the following, the flow of the individual information registration process performed in the automation system 100 according to the embodiment will be described. Furthermore, the processes performed at Steps S101 to S104 described below may be performed in different order. Moreover, some of the processes performed at Steps S101 to S104 described below may be omitted.

At a first step, the engineer EA performs an individual information input process (Step S101). For example, the engineer EA inputs the IP address of the controller 30A and the individual information including the input/output information on the controller 30A and the performance of the controller 30A to the instrument database 20 via the engineer terminal. At a second step, the instrument database 20 performs an individual information storage process (Step S102). For example, the instrument database 20 stores the individual information on the control system A that has been input by the engineer EA in the individual information storage unit 21.

At a third step, the engineer EB performs the individual information input process (Step S103). For example, the engineer EB inputs the IP address of the controller 30B and the individual information including the input/output information on and the performance of the controller 30B to the instrument database 20 via the engineer terminal. At a fourth step, the instrument database 20 performs the individual information storage process (Step S104). For example, the instrument database 20 stores the individual information on the control system B received from the engineer EB in the individual information storage unit 21.

3-2. Flow of Input/Output Information Acquisition Process

In the following, the flow of the input/output information acquisition process performed in the automation system 100 according to the embodiment will be described. Furthermore, the processes performed at Steps S201 to S210 described below may be performed in different order. Moreover, some of the processes performed at Steps S201 to S210 described below may be omitted.

At a first step, the controller 30A performs an input/output setting request process (Step S201). For example, the controller 30A transmits the input/output setting request including the identification information on the controller 30A to the management server 10 at the time of initial setting of the controller 30A that constitutes the control system A. At a second step, the management server 10 performs an input/output information reference process (Step S202). For example, the management server 10 searches the individual information storage unit 21 included in the instrument database 20 on the basis of the identification information on the controller 30A. At a third step, the instrument database 20 performs an input/output information output process (Step S203). For example, the instrument database 20 outputs the input/output information associated with the identification information on the controller 30A to the management server 10. At a fourth step, the management server 10 performs an input/output information reception process (Step S204). For example, the management server 10 receives the input/output information associated with the identification information on the controller 30A from the instrument database 20. At a fifth step, the management server 10 performs an input/output information transmission process (Step S205). For example, the management server 10 transmits the input/output information acquired from the instrument database 20 to the controller 30A.

At a sixth step, the controller 30B performs the input/output setting request process (Step S206). For example, the controller 30B transmits the input/output setting request including the identification information on the controller 30B to the management server 10 at the time of replacement of the field device 40B that constitutes the control system B. At a seventh step, the management server 10 performs the input/output information reference process (Step S207). For example, the management server 10 searches the individual information storage unit 21 included in the instrument database 20 on the basis of the identification information on the controller 30B. At an eighth step, the instrument database 20 performs the input/output information output process (Step S208). For example, the instrument database 20 outputs the input/output information associated with the identification information on the controller 30B to the management server 10. At a ninth step, the management server 10 performs the input/output information reception process (Step S209). For example, the management server 10 receives the input/output information that is associated with the identification information on the controller 30B from the instrument database 20. At a tenth step, the management server 10 performs the input/output information transmission process (Step S210). For example, the management server 10 transmits the input/output information acquired from the instrument database 20 to the controller 30B.

3-3. Flow of Input/Output Information Setting Process

In the following, the flow of the input/output information setting process performed in the automation system 100 according to the embodiment will be described. Furthermore, the processes performed at S Steps S301 to S304 described below may be performed in different order. Moreover, some of the processes performed at Steps S301 to S304 described below may be omitted.

At a first step, the controller 30A performs an API call process (Step S301). For example, the controller 30A calls the common API on the basis of the received input/output information. At a second step, the controller 30A performs an input/output setting process (Step S302). For example, the controller 30A calls the input/output setting API for each system vendor associated with the common API, and sets the input/output module in the controller 30A.

At a third step, the controller 30B performs the API call process (Step S303). For example, the controller 30B calls the common API on the basis of the received input/output information. At a fourth step, the controller 30B performs the input/output setting process (Step S304). For example, the controller 30B calls the input/output setting API for each system vendor associated with the common API, and sets the input/output module in the controller 30B.

4. Effects of Embodiment

Lastly, the effects of the embodiment will be described. In the following, first to tenth effects associated with the process according to the embodiment will be described.

4-1. First Effect

As a first effect, in the process according to the above described embodiment, the controller 30 transmits a request for the input/output setting of the data to the management server 10, receives, from the management server 10, the input/output information that defines the input/output setting and that is associated with each of the controllers 30 that performs control of the associated systems, and performs the input/output setting of the own instrument on the basis of the received input/output information. As a result of this, in this process, it is possible to efficiently perform engineering related to the input/output setting of the data in the automation system while preventing a human error.

4-2. Second Effect

As a second effect, in the process according to the above described embodiment, in a case where the controller 30 receives the input/output information from the management server 10 to which the request for the input/output setting of the data has been transmitted, the controller 30 calls the API associated with the input/output setting by using the input/output information, and performs the setting of the input/output module in the own instrument. As a result of this, in this process, it is possible to efficiently perform engineering related to the input/output setting of the data in the automation system by automatically performing input/output setting that is different for each control system while preventing a human error.

4-3. Third Effect

As a third effect, in the process according to the above described embodiment, the controller 30 calls the API that is common to the control systems and that is related to the input/output setting by using the input/output information, further calls the API that is associated with the input/output setting that is different for each control system, and performs setting of the input/output module provided in the own instrument. As a result of this, in this process, it is possible to efficiently perform engineering related to the input/output setting of the data in the automation system by performing the input/output setting that is common to the control systems, and the input/output setting that is different for each control system while preventing a human error.

4-4. Fourth Effect

As a fourth effect, in the process according to the above described embodiment, the controller 30 receives the input/output information that defines the input/output type of the data passing through each of the input/output channels of the respective controllers 30 and that is associated with each of the pieces of identification information on the respective controllers 30. As a result of this, in this process, it is possible to efficiently perform engineering related to the input/output setting of the data in the automation system by automatically performing the input/output setting by using the individual input/output information on the controller 30 while preventing a human error.

4-5. Fifth Effect

As a fifth effect, in the process according to the above described embodiment, the management server 10 acquires the input/output information in a case where the management server 10 accepts the input/output setting request transmitted from the controller 30 when the controller 30 is connected to the communication network including the management server 10 for the first time or when a control system including the controller 30 is connected to the communication network including the management server 10 after the system configuration has been changed. As a result of this, in this process, it is possible to efficiently perform engineering related to the input/output setting of the data in the automation system by automatically performing the input/output setting when the initial connection or the changed connection to the communication network of the control system is established as a trigger while preventing a human error.

4-6. Sixth Effect

As a sixth effect, in the process according to the above described embodiment, the controller 30 conforms to OPA, MTP, or NOA. As a result of this, in this process, it is possible to efficiently perform engineering related to the input/output setting of the data in the automation system that is being standardized as international standards while preventing a human error.

4-7. Seventh Effect

As a seventh effect, in the process according to the above described embodiment, the controller 30 conforms to OPC UA. As a result of this, in this process, it is possible to efficiently perform engineering related to the input/output setting of the data in the automation system conforming to OPC UA while preventing a human error.

4-8. Eighth Effect

As an eighth effect, in the process according to the above described embodiment, the controller 30 performs control of the plant. As a result of this, in this process, it is possible to efficiently perform engineering related to the input/output setting of the data in the automation system in a plant in which safety is required while preventing a human error.

4-9. Ninth Effect

As a ninth effect, in the process according to the above described embodiment, in a case where the management server 10 has accepted the input/output setting request for the data in the controller 30, the management server 10 acquires the input/output information that defines the input/output setting and that is associated with each of the controllers 30, and transmits the input/output information to the controller 30 in which the input/output setting request for the data has been accepted. As a result of this, in this process, it is possible to efficiently perform engineering related to the input/output setting of the data in the automation system by using the management server 10 while preventing a human error.

4-10. Tenth Effect

As a tenth effect, in the process according to the above described embodiment, in a case where the management server 10 has accepted the input/output setting request for the data, the management server 10 refers to the predetermined database that stores therein the input/output information, and acquires the input/output information associated with the identification information on the controller 30 in which the input/output setting request for the data has been accepted. As a result of this, in this process, it is possible to efficiently perform engineering related to the input/output setting of the data in the automation system by automatically performing the input/output setting by using the individual input/output information on the controllers 30 registered in advance while preventing a human error.

System

The flow of the processes, the control procedures, the specific names, and the information containing various kinds of data or parameters indicated in the above specification and drawings can be arbitrarily changed unless otherwise stated.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of each of the processing functions performed by the each of the devices can be implemented by a CPU and by programs analyzed and executed by the CPU or implemented as hardware by wired logic.

Hardware

Figure 6:
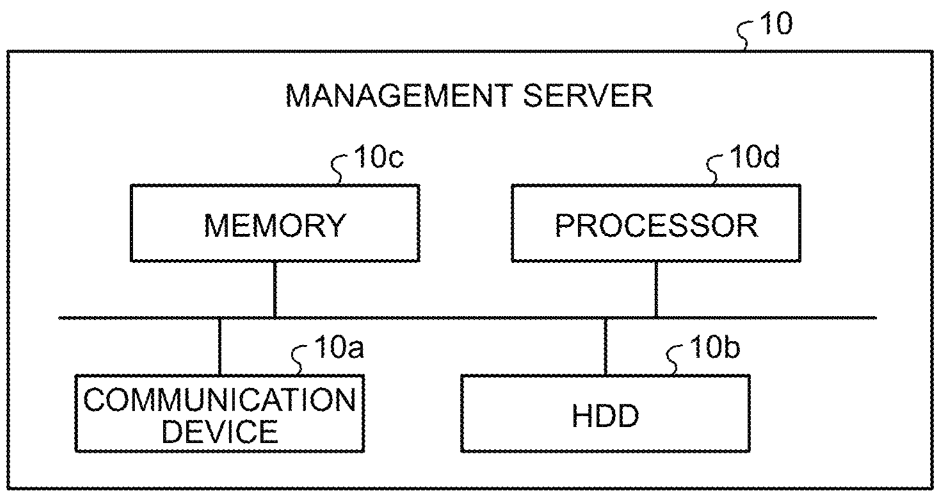
FIG. 6 is a diagram illustrating an example of a hardware configuration according to the embodiment.

In the following, an example of a hardware configuration of the management server 10 that is the information processing apparatus will be described. Moreover, the same hardware configuration may also be used for the other device, such as the controller 30. FIG. 6 is a diagram illustrating an example of the hardware configuration according to the embodiment. As illustrated in FIG. 6, the management server 10 includes a communication device 10*a*, a hard disk drive (HDD) 10*b*, a memory 10*c*, and a processor 10*d*. Furthermore, each of the units illustrated in FIG. 6 is connected by a bus or the like with each other.

The communication device 10*a* is a network interface card or the like, and communicates with another server. The HDD 10*b* stores therein the database and the programs that operate the functions illustrated in FIG. 3.

The processor 10*d* operates the process that executes each of the functions described above in FIG. 3 or the like by reading the programs that execute the same processes as those performed by each of the processing units illustrated in FIG. 3 from the HDD 10*b* or the like and loading the read programs in the memory 10*c*. For example, the process executes the same functions as those performed by each of the processing units included in the management server 10. Specifically, the processor 10*d* reads, from the HDD 10*b* or the like, the programs having the same functions as those performed by the acceptance unit 13*a*, the acquisition unit 13*b*, the transmission unit 13*c*, and the like. Then, the processor 10*d* executes the same processes as those performed by the acceptance unit 13*a*, the acquisition unit 13*b*, the transmission unit 13*c*, and the like.

In this way, the management server 10 is operated as a device that performs various processing methods by reading and executing the programs. Furthermore, the management server 10 is also able to implement the same functions as those described above in the embodiment by reading the above described programs from a recording medium by a medium reading device and executing the read programs. In addition, the programs described in another embodiment are not limited to be executed by the management server 10. For example, the present invention may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and reading the programs from the recording medium by the computer.

According to the present invention, an advantage is provided in that it is possible to efficiently perform engineering related to the input/output setting of the data in the automation system.

What is claimed is:

1. A controller for an industrial automation system, comprising:

a transmission/reception unit that transmits a request for input/output setting of data to an information processing apparatus, and that receives, from the information processing apparatus, input/output information for at least one of a plurality of input/output channels of the controller, the input/output information defining a physical input/output type that is associated with the at least one of the plurality of input/output channels, the input/output information being associated with the controller that performs control of an associated system including a plurality of field instruments in a plant; and a setting unit that performs the input/output setting of an input/output module of the controller based on the received input/output information.

2. The controller according to claim 1, wherein, in a case where the setting unit receives the input/output information from the information processing apparatus to which the request has been transmitted, the setting unit calls an application programming interface that is associated with the input/output setting by using the input/output information, and performs setting of an input/output module in the controller.

3. The controller according to claim 2, wherein the setting unit calls an application programming interface that is common to the associated system and that is related to the input/output setting by using the input/output information, further calls the application programming interface that is associated with the input/output setting that is different for each system, and performs setting of an input/output module in the controller.

4. The controller according to claim 1, wherein the transmission/reception unit receives the input/output information that defines an input/output type of the data passing through each of input/output channels of the controller and that is associated with identification information on the controller.

5. The controller according to claim 1, wherein the transmission/reception unit transmits the request to the information processing apparatus when the controller is connected to a communication network including the information processing apparatus for the first time, or when a control system including the controller is connected to the communication network after a system configuration has been changed.

6. The controller according to claim 1, wherein the controller conforms to Open Process Automation (OPA), Module Type Package (MTP), or NAMUR Open Architecture (NOA).

7. The controller according to claim 1, wherein the controller conforms to Open Platform Communications Unified Architecture (OPC UA).

8. A setting method executed by a computer of a controller for an industrial automation system, the setting method comprising:

transmitting a request for input/output setting of data to an information processing apparatus;

receiving, from the information processing apparatus, input/output information for at least one of a plurality of input/output channels of the controller, the input/output information defining a physical input/output type that is associated with the at least one of the plurality of input/output channels, the input/output information being associated with the controller that performs control of an associated system including a plurality of field instruments in a plant; and performing the input/output setting an input/output module of on the controller based on the received input/output information.

9. A non-transitory computer-readable recording medium having stored therein a setting program that causes a computer of a controller for an industrial automation system to execute a process comprising:

transmitting a request for input/output setting of data to an information processing apparatus;

receiving, from the information processing apparatus, input/output information for at least one of a plurality of input/output channels of the controller, the input/output information defining a physical input/output type that is associated with the at least one of the plurality of input/output channels, the input/output information being associated with the controller that performs control of an associated system including a plurality of field instruments in a plant; and performing the input/output setting of the controller based on the received input/output information.

10. An information processing apparatus comprising:

an acquisition unit that acquires, in a case where the acquisition unit has accepted a request for input/output setting of data in a controller that performs control of an industrial automation system including a plurality of field instruments in a plant, input/output information for at least one of a plurality of input/output channels of the controller, the input/output information defining a physical input/output type that is associated with the at least one of the plurality of input/output channels of the controller and that is associated with the controller; and a transmission unit that transmits the input/output information to the controller in which the request has been accepted.

11. The information processing apparatus according to claim 10, wherein, in a case where the acquisition unit has accepted the request, the acquisition unit refers to a predetermined database that stores therein the input/output information, and acquires the input/output information that is associated with identification information on the controller in which the request has been accepted.

12. The controller according to claim 1, wherein the physical input/output type includes at least one of Analog Input (AI), Analog Output (AO), Digital Input (DI), and Digital Output (DO).

13. The setting method according to claim 8, wherein the physical input/output type includes at least one of Analog Input (AI), Analog Output (AO), Digital Input (DI), and Digital Output (DO).

14. The non-transitory computer-readable recording medium according to claim 9, wherein the physical input/output type includes at least one of Analog Input (AI), Analog Output (AO), Digital Input (DI), and Digital Output (DO).

15. The information processing apparatus according to claim 10, wherein the physical input/output type includes at least one of Analog Input (AI), Analog Output (AO), Digital Input (DI), and Digital Output (DO).

* * * * *